(12) United States Patent
Rives et al.

(10) Patent No.: US 10,098,380 B2
(45) Date of Patent: Oct. 16, 2018

(54) PRESSURE DIFFERENTIAL DEVICE

(71) Applicants: William Jordan Rives, Charlotte, NC (US); John Lynn McCants, Jr., Atlanta, GA (US)

(72) Inventors: William Jordan Rives, Charlotte, NC (US); John Lynn McCants, Jr., Atlanta, GA (US)

( * ) Notice: Subject to any disclaimer, the term of this patent is extended or adjusted under 35 U.S.C. 154(b) by 89 days.

(21) Appl. No.: 15/215,560

(22) Filed: Jul. 20, 2016

(65) Prior Publication Data

US 2018/0020719 A1 Jan. 25, 2018

(51) Int. Cl.
| | | |
|---|---|---|
| A24F 1/30 | (2006.01) | |
| A24F 5/00 | (2006.01) | |
| A24F 47/00 | (2006.01) | |
| A24F 1/32 | (2006.01) | |
| H05B 1/02 | (2006.01) | |
| F16L 17/06 | (2006.01) | |

(52) U.S. Cl.
CPC .................. *A24F 1/30* (2013.01); *A24F 1/32* (2013.01); *A24F 5/00* (2013.01); *A24F 47/006* (2013.01); *A24F 47/008* (2013.01); *F16L 17/06* (2013.01); *H05B 1/0291* (2013.01)

(58) Field of Classification Search
CPC ........................................................ A24F 1/30
See application file for complete search history.

(56) References Cited

U.S. PATENT DOCUMENTS

| | | | | |
|---|---|---|---|---|
| 3,882,875 | A * | 5/1975 | Frost .......................... | A24F 1/30 131/173 |
| 4,014,353 | A * | 3/1977 | Kahler ....................... | A24F 1/30 131/173 |
| 4,096,868 | A * | 6/1978 | Norman ..................... | A24F 1/30 131/173 |
| 6,260,554 | B1 * | 7/2001 | Rowland .................... | A24F 1/26 131/173 |
| 6,474,342 | B1 * | 11/2002 | Rennecamp ............ | A24F 23/04 131/241 |
| 2009/0084391 | A1 * | 4/2009 | Krupp ....................... | A24F 1/30 131/173 |
| 2013/0039639 | A1 * | 2/2013 | Carney ...................... | A61L 9/03 392/386 |
| 2013/0146070 | A1 * | 6/2013 | Ross ......................... | A24F 1/30 131/173 |
| 2015/0257443 | A1 * | 9/2015 | Rado ........................ | A24F 47/00 392/390 |
| 2016/0029696 | A1 * | 2/2016 | Obeidallah ........... | A24F 47/008 131/329 |
| 2016/0249678 | A1 * | 9/2016 | Katz .......................... | A24F 1/00 131/192 |
| 2017/0055570 | A1 * | 3/2017 | Elhalwani ................. | A24F 1/30 |
| 2017/0224015 | A1 * | 8/2017 | Basil ..................... | A24F 47/008 |

\* cited by examiner

*Primary Examiner* — Eric Yaary
(74) *Attorney, Agent, or Firm* — Gleam Law, PLLC; Neil Juneja

(57) ABSTRACT

A pressure differential device for attachment to a vessel to be used to smoke or vaporize tobacco or other consumables substances meant to be inhaled for pulmonary applications. The pressure differential device includes a chamber for receiving consumables, a tunnel running through the device, a flange for proper seating in a vessel, and a inner protruding member for attaching tunnel extension such as a straw.

16 Claims, 12 Drawing Sheets

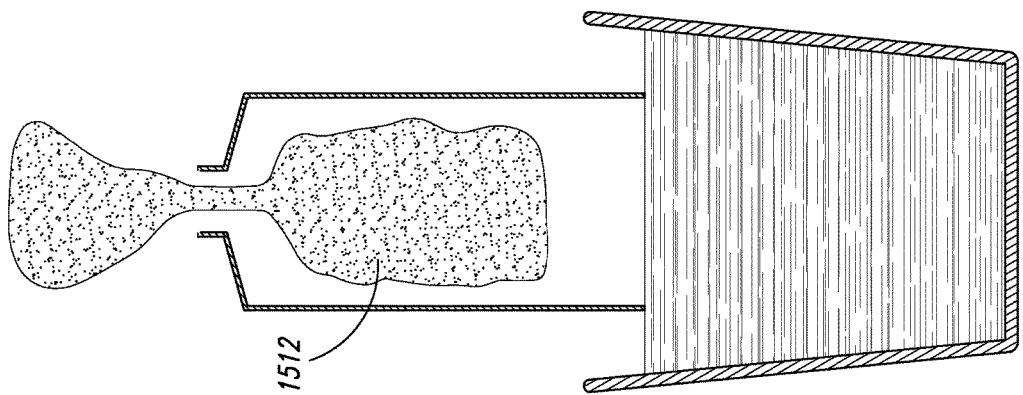
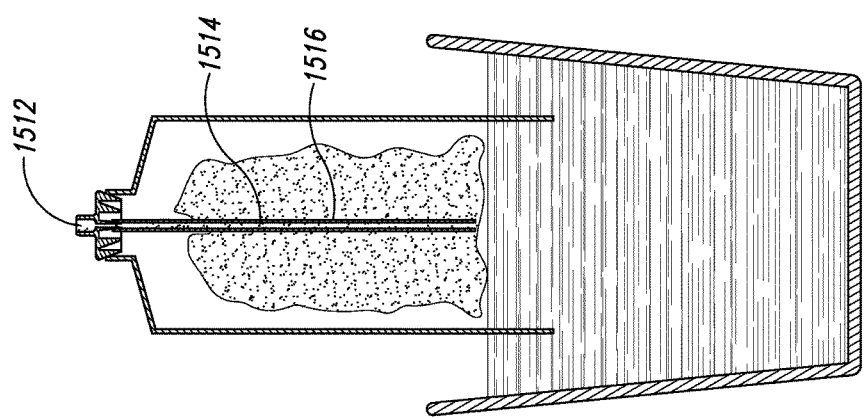
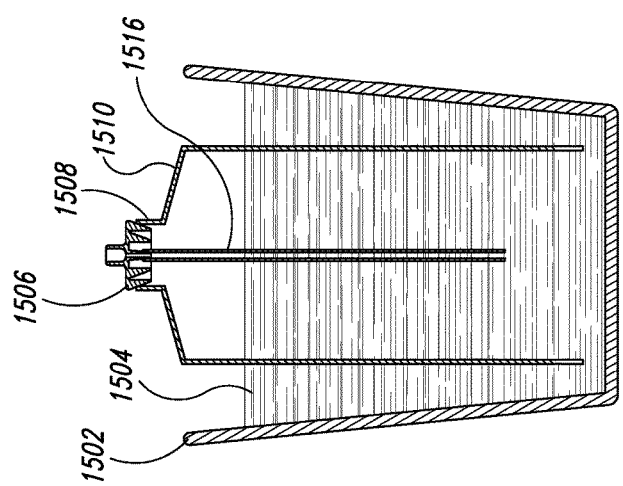

PRESSURE DIFFERENTIAL DEVICE

BACKGROUND

Since before the dawn of civilization, humans have been administering herbs and other plants by any effective means possible. First, early man realized that certain foods provided beneficial effects. Over time, the wisest of the tribes discovered that some herbs, roots, and other natural components have curative properties. The administration of compounds through food or water was the most common and intentional methods used by our ancestors. Later, the civilized people discovered the effects of topical applications. Eventually, particulates suspended in air and administered through pulmonary application were discovered.

The first inhalants were consumed by inhaling smoke, presumably discovered when certain plant matter was burned in a campfire and the tribal "doctor" drew the connection between the inhalation of smoke and the effects on his people. Eventually, methods of harnessing the smoke were developed. Medicine pipes were invented and revered. In some cases, sophisticated traditions were created around smoking of a pipe. In time, cigarettes were also created.

Almost every culture across the world used local materials and knowledge to create new designs of pipes to achieve an easy and effective method of smoking. In the sixteenth and seventeenth centuries, the hookah and water pipe were introduced in Europe following the introduction of tobacco from the new world. The water pipe was introduced in China during the late Ming Dynasty, also for smoking tobacco. The addition of water into the smoking device allowed for cooling and filtering of the smoke. Water filtration provided a healthier and preferred smoke.

In the late twentieth century, the youth of the US searched for novel ways to smoke tobacco and other organic matter using water. One inventive method utilized a disposable plastic bottle and a container filled with liquid, sometimes referred to as a gravity bong. A user would create a cap for a single use through modification of the existing bottle cap by melting the plastic and adding a receptacle for combustible substances. This created issues with poor hermetic sealing, dangerous thermal issues, no reusability, and no portability, no usability on different type of plastic bottles, among other problems. In addition, the known methods did not have the benefits of utilizing the water for filtration.

Thus, there exists a need for a portable device capable of fitting on vessels with varying sized openings and allowing for water filtration.

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

In accordance with the embodiments of the present disclosure, a pressure differential device for attachment on a vessel holding liquid is provided. The pressure differential device is configured to receive tobacco, or other substances intended to be smoked or vaporized. The pressure differential device is affixed to the top of a vessel, such as a plastic disposable drinking bottle.

In the first embodiment of the disclosed pressure differential device is demountably coupleable to a vessel. The pressure differential device further includes a body, with a first end and a second end, the first end having a chamber flange laterally circumscribing a chamber. A tunnel vertically intersects the body running to the chamber on the first end and through a tapered inner protruding member on the second end. The second end has a tapered radial flange circumscribing the inner protruding member. Between the tapered flange and the inner protruding member is a tapered second flange.

In alternate embodiments of the pressure differential device, the second flange is not present. In one such embodiment, the body is spherical rather than tapered. This embodiment also has impressions on the first end for use in leverage and/or attachment. Other embodiments incorporate a heating element and power source for the purpose of vaporization.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 15A-C are figures describing a bucket bong embodiment.

DETAILED DESCRIPTION

Description

Figure 1:
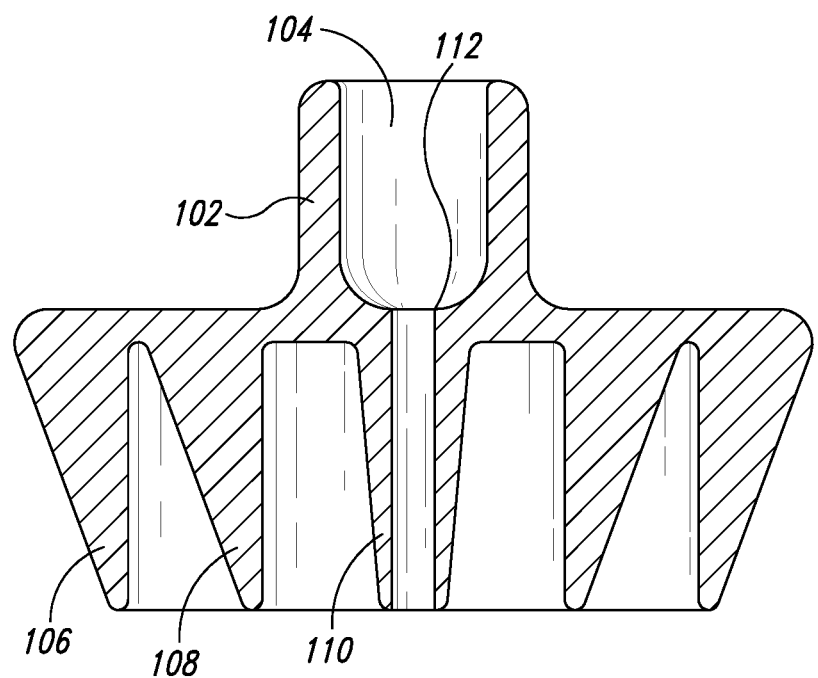
FIG. 1 is a side view cutout of one embodiment.
Figure 2:
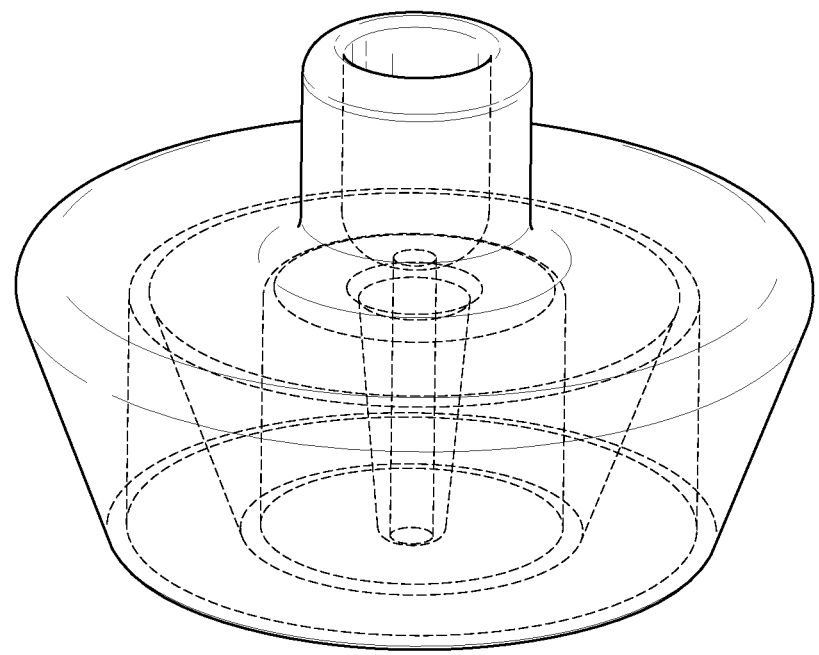
FIG. 2 is a perspective view and partial transparency of one embodiment.
Figure 3:
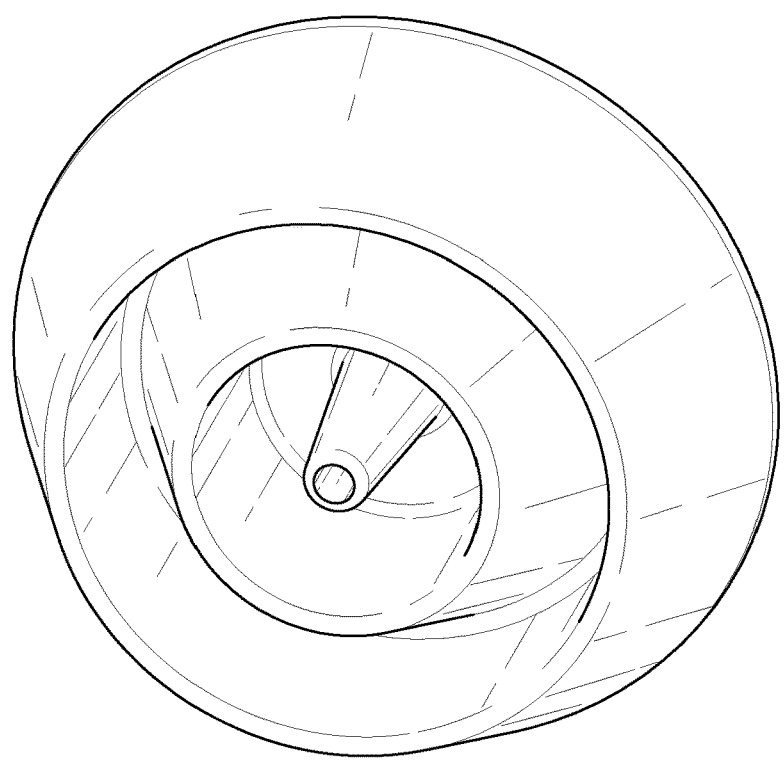
FIG. 3 is a bottom perspective view of one embodiment.
Figure 4:
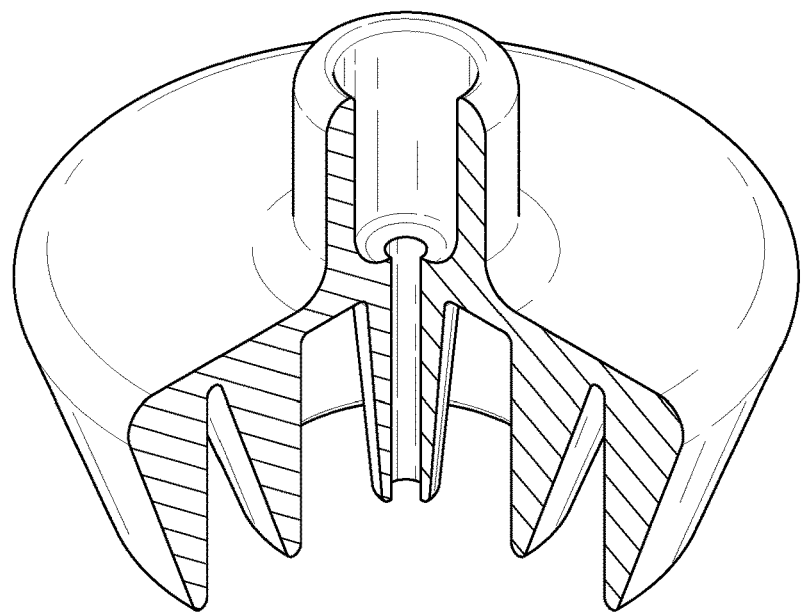
FIG. 4 is a cross sectional perspective view of one embodiment.

Embodiments of the present disclosure, a pressure differential device, are generally directed at an apparatus used in the consumption of tobacco or other combustible or vaporizable substances and utilizing liquid. This discussion should not be construed as limiting the pressure differential device to those particular embodiments. Practitioners skilled in the art will recognize numerous other embodiments. The pressure differential device constructed in accordance with each embodiment of the present disclosure is best understood by referring to FIGS. 15-16.

The pressure differential device may be used on a liquid-holding vessel and may be designed to create air suction through gravity whereby the fluid is replaced by smoke or vapor and the surrounding atmosphere. Another use is heating and/or vaporizing solids, liquids, and low viscosity liquids, such as concentrated extracts. Any tobacco, solids, liquid, low viscosity liquids, or substitutes, will hereinafter be referred to as combustible substances.

For the purposes of this disclosure, smoke and vapor may be used interchangeably and water shall refer to any liquid.

Referring to FIG. 1-4, a Body 100 is comprised of a First End 114 and a Second End 115, the Body 100 being approximately circular. The First End 114 is further comprised of a Chamber 104. The Chamber 104 is laterally circumscribed by a Chamber Flange 102. The Chamber 104 is further comprised of one opening disposed on the First End 114 and one opening towards the Second End 115. In other embodiments, the Chamber Flange 102 is not present. Combustible substances may be disposed within the Chamber Flange 102 in the Chamber 104. A Tunnel 112 is disposed through the First End 114 and the Second End 115 and runs vertically and along the axial length of the Body 100. The Tunnel 112 is hollow and allows atmosphere to travel between the first end 114 and the Second End 115. The Chamber 104 is wider than the Tunnel 112 to mitigate combustible substances and combustible substance byproduct from falling through the Tunnel 112. In some embodiments, a screen (not shown) can be added between the Chamber 104 and the Tunnel 112 to further reduce combustible substances from falling from the Chamber 104 into the Tunnel 112. In other embodiments, a screen is substituted for other means designed to allow air communication between the Chamber 104 and the Second End 115 through the Tunnel 112, but reduce combustible substances from entering the Tunnel 112, the substitution means being obvious to one skilled in the art. The Body 100 is further comprised of a Radial Flange 106 located on the distal end of the Second End 115. In some embodiments, the Radial Flange 106 is tapered to allow a hermetic seal on a vessel Top Aperture through downward pressure of the Body 100. In other embodiments, the Body 100 is shaped as a frustum when the Radial Flange 106 is tapered. The Body 100 shaped as a frustum adds advantages in reducing construction complexity and increasing the durability of the pressure differential device. An Inner Protruding Member 110 is disposed on Second End 115 and the Tunnel 112 runs through the Inner Protruding Member 110. The Inner Protruding Member 110 may be shorter than the Second End 115, of approximately equal length as the Second End 115, or longer than the Second End 115. The Inner Protruding Member 110 is hollow and approximately cylindrical. In this embodiment, the Inner Protruding Member 110 is tapered, to allow coupling with an elongated hollow cylinder, such as a drinking straw, to be more easily attached to and temporarily extend the air passageway of the Tunnel 112 into the vessel. The extension of Tunnel 112 allow for water filtration of vapors through liquid in the vessel. It should be appreciated that a taper is not required and not present in all contemplated embodiments of the present invention, but allows for different size attachments and a better hermetic seal. In the presently illustrated example, a Second Flange 108 circumscribes the Inner Protruding Member 110 and is tapered. It should be appreciated that the taper is not required in all embodiments. Second Flange 108 is configured to fit alternate sized vessel Top Apertures. In one embodiment, Second Flange 108 fits regular soda pop bottle Top Aperture and Radial Flange 106 fits wide-mouth soda pop bottles. The Radial Flange and Second Flange can take different size, shapes, and orientations to fit other vessel Top Apertures.

In some embodiments, the Radial Flange 106 is further comprised of a gasket (not shown) to create a more effective hermetic seal between the Radial Flange 106 and a vessel Top Aperture, the gasket being circular. In other alternate embodiments, the Second Flange 108 may also be further comprised with a gasket for the same purpose as the Radial Flange 106 gasket. The Inner Protruding Member 110 may have a gasket for the same purpose as the Radial Flange 106 gasket or the Second Flange 108 gasket. In some embodiment, one or more threads (not shown) may be placed on one or more vertical surfaces of the Radial Flange 106 or on one or more vertical surfaces of the Second Flange 108 to increase friction or allow for proper fitment onto a threaded vessel Top Aperture. In other embodiments, teeth, ribs, knurling, or other methods of increasing friction may be used instead of one or more threads.

Numerous construction materials are contemplated. The present invention may be constructed from one or more of the following: stainless steel, aluminum, alloys, brass, ceramic, acrylic, polymers, composites, materials including electroplating, anodized materials, or combination of materials. In some embodiments, multiple materials may be utilized for different components. In the illustrated embodiments 1-4, the pressure differential device is constructed of aluminum with a coating of titanium nitride. However, it should be appreciated that other material may be used so long as the material used for the Chamber 102 and the Chamber Flange 102 (when present) has the thermal tolerance for combustion or vaporization of the combustible substance. The pressure differential device may be further comprised of coating or layer of materials such as ceramic or materials having thermal insulatory properties. One advantage of this using thermal insulatory materials on the exterior of the pressure differential device is to protect the user from burns caused by touching the pressure differential device.

Figure 5:
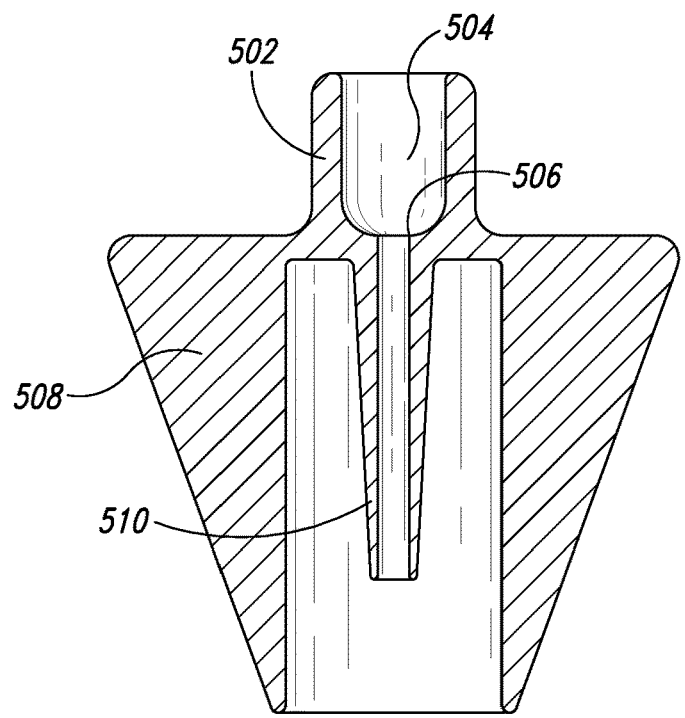
FIG. 5 is a side-view cross sectional of the another embodiment.
Figure 6:
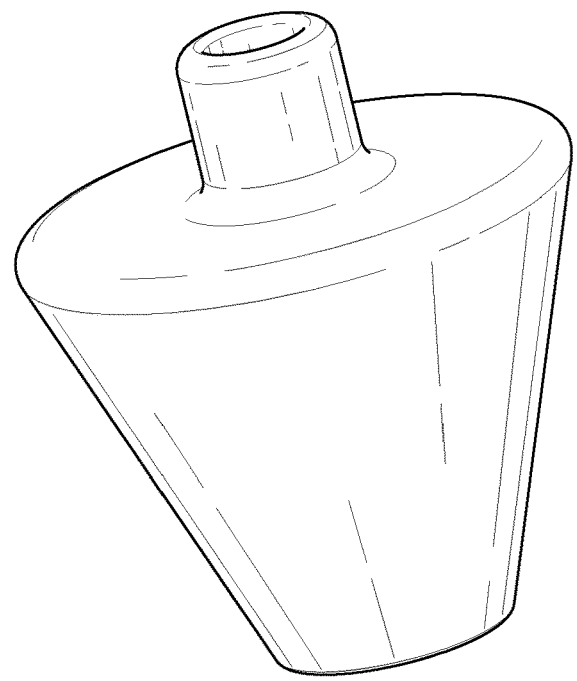
FIG. 6 is an isometric top view of another embodiment.

Referring to FIGS. 5-6, a second embodiment is illustrated without the Second Flange. Utilizing the configuration and descriptions of FIGS. 1-4, the Chamber Flange 502 laterally circumscribes a Chamber 504, which is in air communication with a Tunnel 506, wherein the tunnel intersects and is in air communication with a Protruding Inner Member 510. As in FIGS. 1-4, Chamber 504 is wider than the Tunnel 506. In this embodiment, the Radial Flange is tapered and can fit a wider range of vessel Top Apertures. Also, in this embodiment, the Inner Protruding Member does not extend as far towards the Second End as the Radial Flange 508. One advantage is that the Inner Protruding Member is protected from damage.

Figure 7:
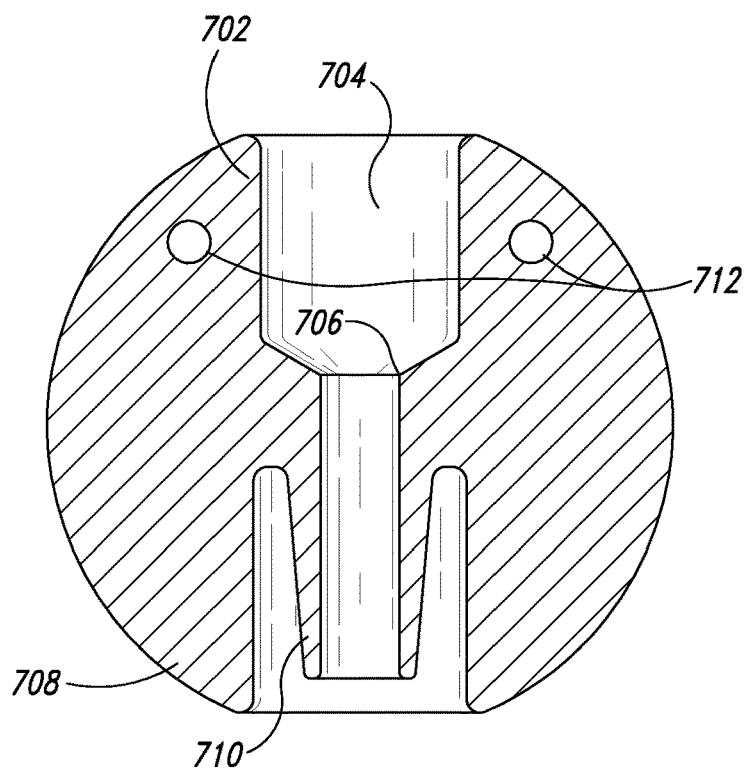
FIG. 7 is a cross sectional side view of a spherical embodiment.
Figure 8:
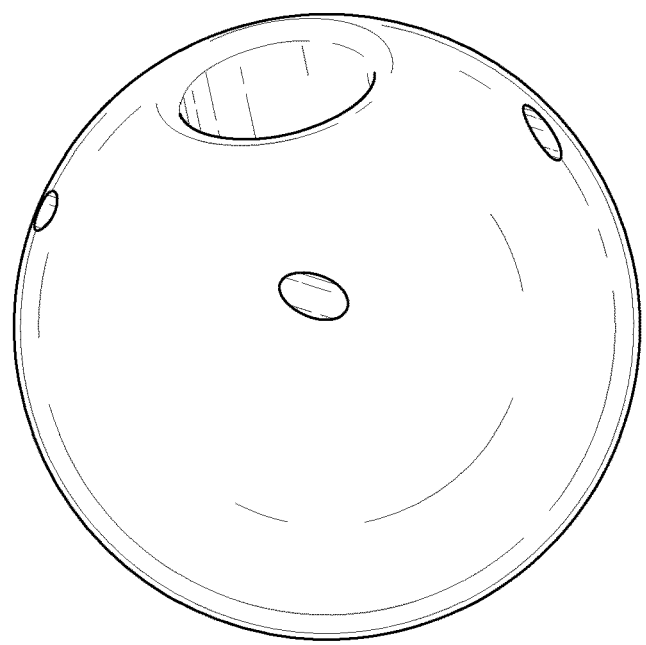
FIG. 8 is an isometric view of the side and top view of a spherical embodiment.
Figure 9:
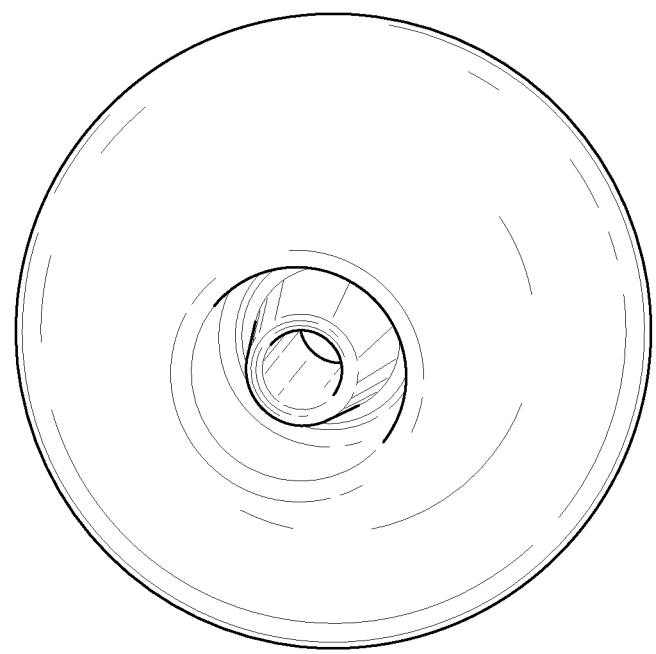
FIG. 9 is an isometric view of the bottom of a spherical embodiment.
Figure 10:
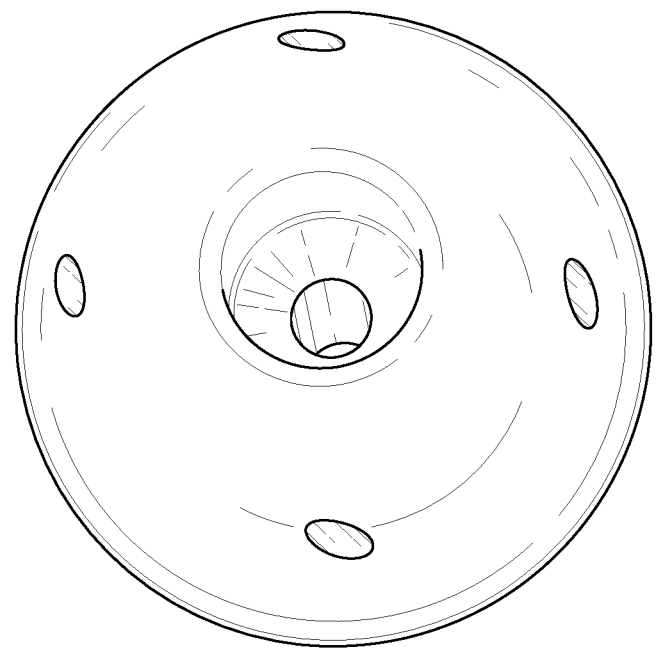
FIG. 10 is an isometric view of the bottom of a spherical embodiment.
Figure 11:
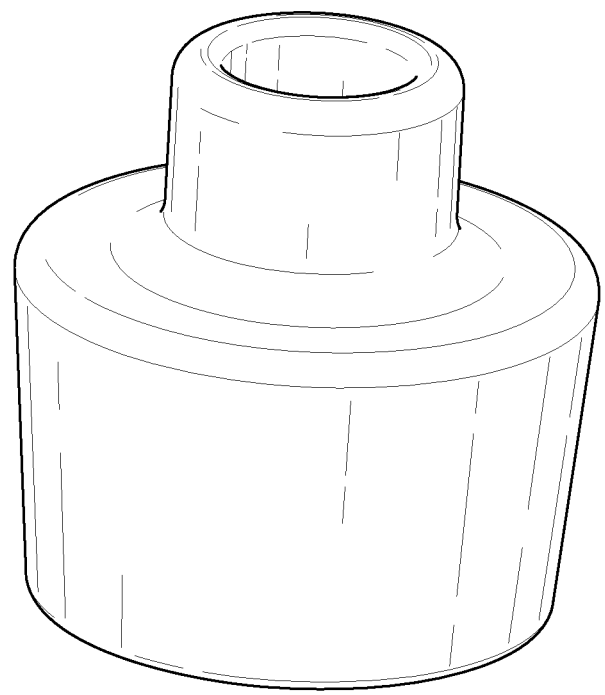
FIG. 11 is a side isometric view of an embodiment.
Figure 12:
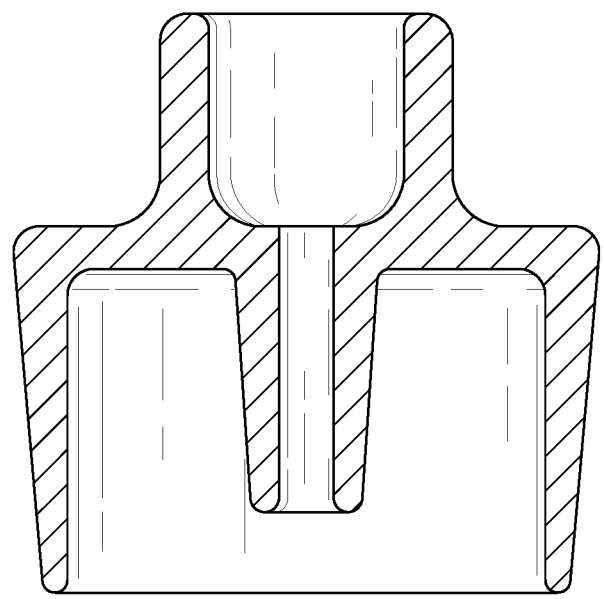
FIG. 12 is a side view cross sectional of an embodiment.
Figure 13:
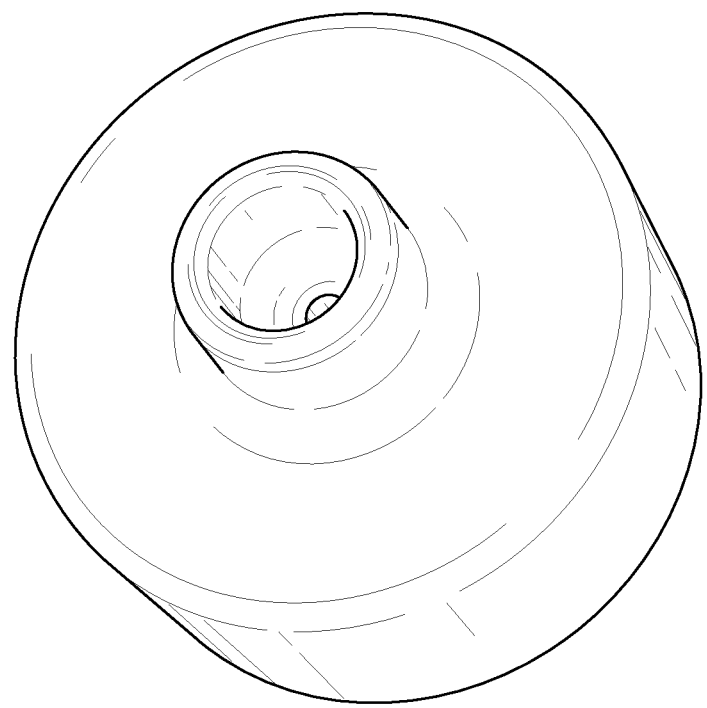
FIG. 13 is a top isometric view of another embodiment.
Figure 14:
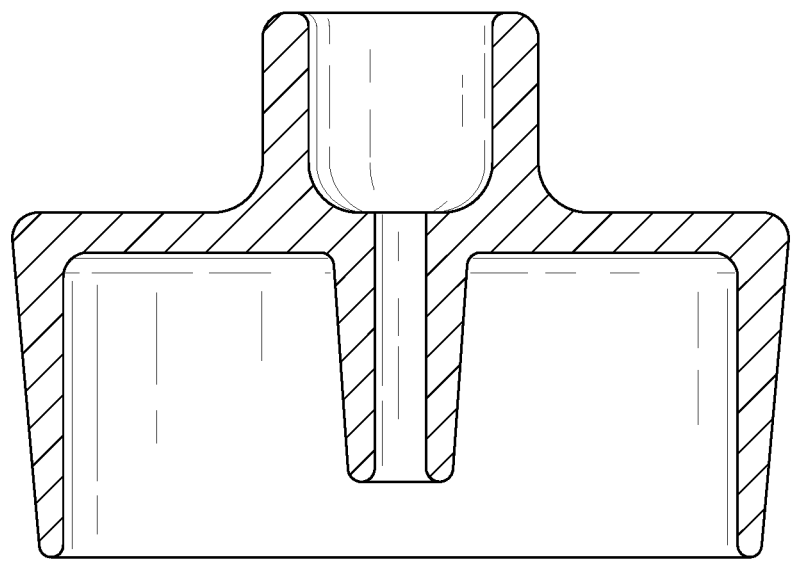
FIG. 14 is a side view cross sectional of another embodiment.

Referring to FIG. 7-8, an embodiment of a pressure differential device is illustrated with an approximately spherical shape comprising of a First End 702, a Second End 708, a Chamber 704, an Inner Protruding Member disposed within the Second End 708, a Tunnel 706 located towards the Second End 708 and in air communication with the Chamber 704 and the Inner Protruding Member 710, and one or more Perforations 712. The Perforations 712 are located on the First End 702. Although the illustrations show four Perforations 712, it should be apparent that any number of Perforations is not intended to be limiting. The Perforations 712 may be shallow or may connect to one or more Perforations 712 within the pressure differential device creating passages (not shown). In other embodiments, one or more perforations may be disposed on the Second End 708 (not shown). In alternate embodiments, one or more Perforations 712 on the First End 702 are in air communication with one or more Perforations located on the Second End 708 to allow air to pass from the exterior of the First End 702 into the vessel without passing through the Chamber 704 and the Tunnel 706. One or more Perforations 712 may be useful to dissipate heat, to create a hold for a lever to assist in the separation of the pressure differential device from a vessel, as a place to attach a hanging means, allow for additional air to enter the vessel at a configurable rate, or other uses contemplated.

Referring to FIGS. 11-14 and 17-21, these two embodiment contains the same components as FIGS. 5-6. FIGS. 11-14 illustrates a less tapered second end and larger chamber and chamber flange. The chamber is elevated at the distal end of the body. Functionality is approximately the same as FIGS. 5-6. The embodiment shown in FIGS. 17-20 illustrates a chamber integrated further within the body. In this embodiment, the Chamber Flange is not required and the Chamber can be fully enclosed within the First End. Functionality is the same among all embodiment in FIG. 5-6, FIGS. 11-14, and FIGS. 17-21.

FIGS. 15-16 show two uses of the present invention. These illustrations are not to limit the uses of the present invention, but to demonstrate two methods of using the pressure differential device. The embodiment shown in FIG. 1-4 is used for example purposes, only. Other embodiments may be substituted.

Referring to FIG. 15A-15C, one illustration of a use of a pressure differential device is shown, sometimes referred to as a bucket bong. First referring to FIG. 15A, a Container 1502 or other container suitable for holding liquid, is filled with water 1504. Other liquids may be added to or substituted for water. A vessel 1510 may be any container with an open bottom and a Top Aperture 1508. Common vessels can be constructed from disposable plastic drinking bottles with the bottom removed. Any vessel may be substituted as long as the Top Aperture and open bottom are present and pressure is able to be manipulated in accordance with this FIG. 15 disclosure. The pressure differential device 1506 is coupled to the Top Aperture 1508 to create a hermetic seal between the Chamber previously described and the vessel 1510, whereby the Axial Flange or the Second Flange is fit into the Top Aperture 1508 of the vessel. In some embodiments, a thread on either the Axial Flange or the Second Flange allows for the pressure differential device to be screwed into a thread located on the Top Aperture 1508. In alternate embodiments, the Top Aperture 1508 is fit within and circumscribes a tapered internal wall of the pressure differential device as opposed to an external wall of the Axial Flange or the Second Flange. An Elongated Hollow Cylinder 1516 is attached to the Inner Protruding Member to extend the Tunnel into the water 1504. It is preferred that the Elongated Hollow Cylinder 1516 is not longer than the Vessel 1510. Now referring to FIG. 15B, combustible substance is first placed inside Chamber 1512. Upon applying sufficient heat to the Chamber 1512 to cause a chemical reaction of the combustible substance and create smoke or vapor, vessel 1510 is elevated upward. Heat may be applied through fire, such as a lighter, causing combustion of the combustible substance, or through other heating means such as by a heating element to cause vaporization of the combustible substance. The elevation of Vessel 1510 causes water contained within the vessel to lower to the equilibrium state of the water in the Container 1502 resulting in negative air pressure within vessel 1510 causing air being drawn into vessel 1510 through the pressure differential device 1506. Air passing downward through pressure differential device draws air from the Chamber 1512 and Smoke 1512 is brought into the Vessel 1510 interior. Now referring to FIG. 15C, the pressure differential device 1506 is removed from the Top Aperture 1508. The Smoke 1512 can be inhaled through the Top Aperture 1508. Smoke 1512 release may be greatly accelerated by rapidly immersing vessel 1510 downward into the Container 1502. The addition of the Elongated Hollow Cylinder 1516 allows for the Smoke 1512 to pass through water. One benefit of passing Smoke 1512 through water is to reduce tar and particulate. Another benefit is cooling the Smoke 1512, causing it to compress and allow more volume to be administered per application. The Elongated Hollow Cylinder 1516 is not required for the proper use of the present invention and is user optional.

Figure 16C:
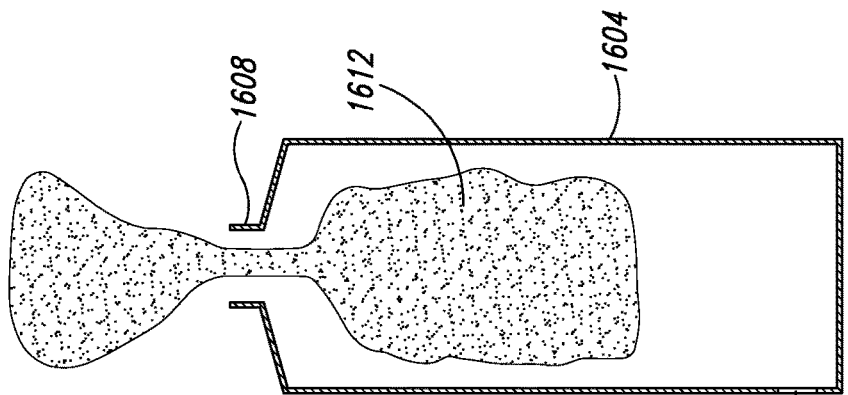
FIG. 16A-C are figure describing a waterfall bong embodiment.
Figure 16B:
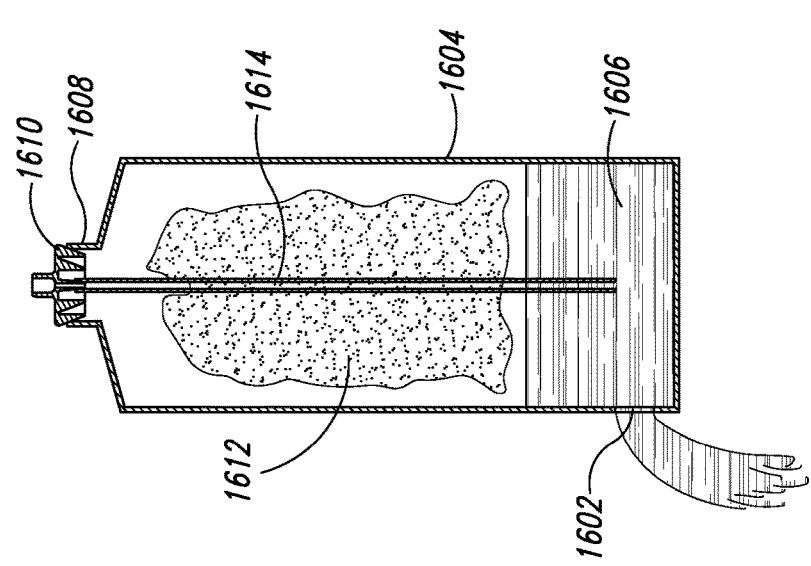
Figure 16A:
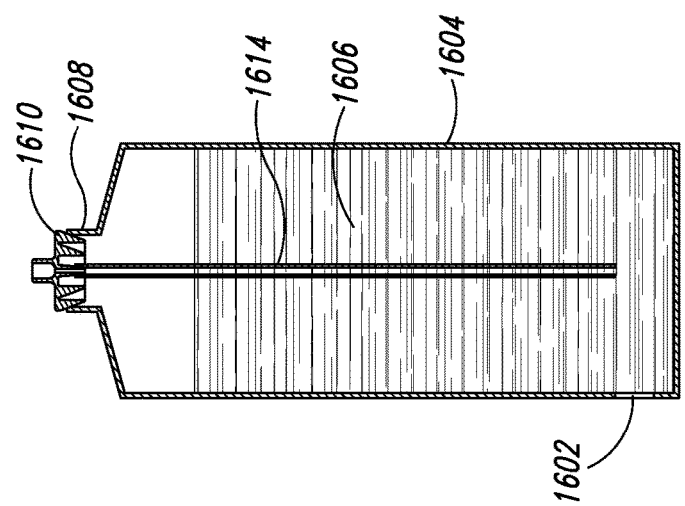
Figure 17:
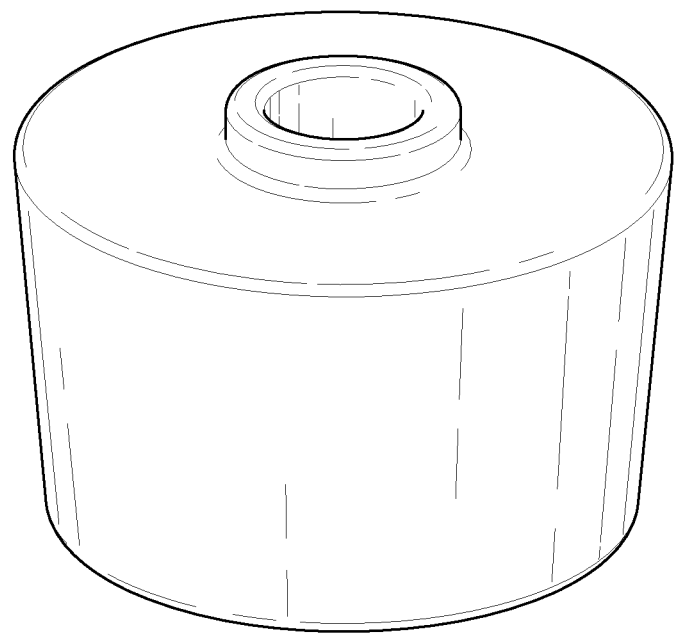
FIG. 17 is an isometric view of the side and top of another embodiment.
Figure 18:
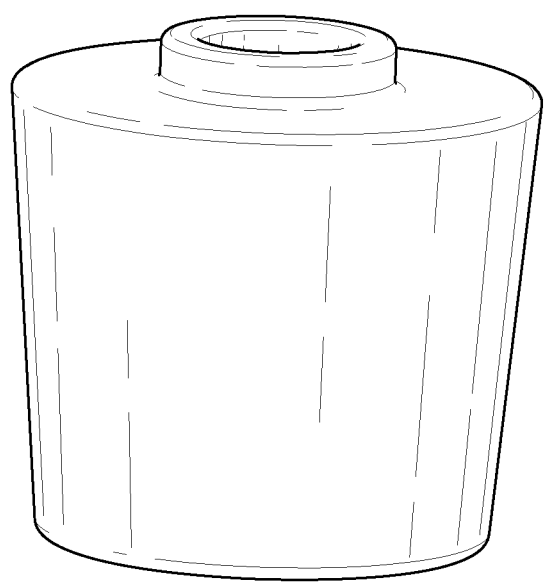
FIG. 18 is an isometric view of a side of another embodiment.
Figure 19:
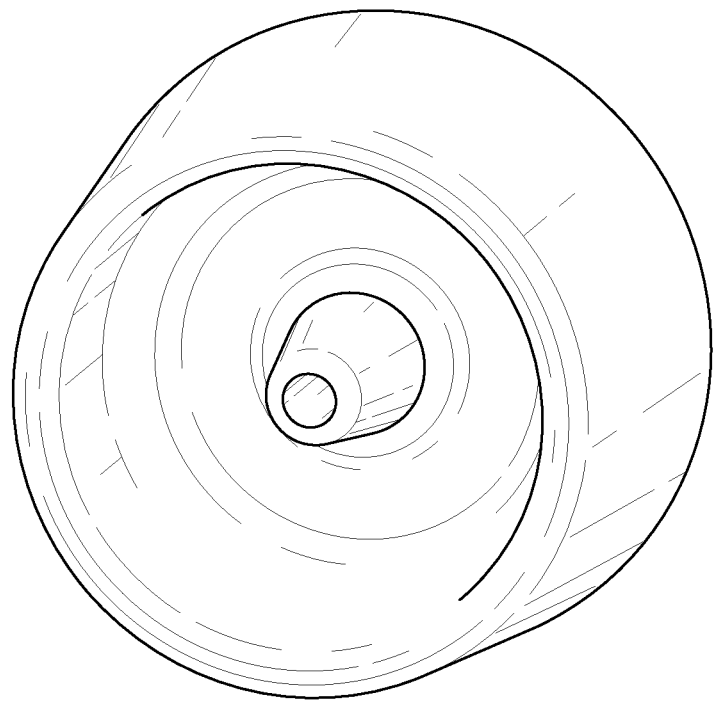
FIG. 19 is an isometric view of the bottom of another embodiment.
Figure 20:
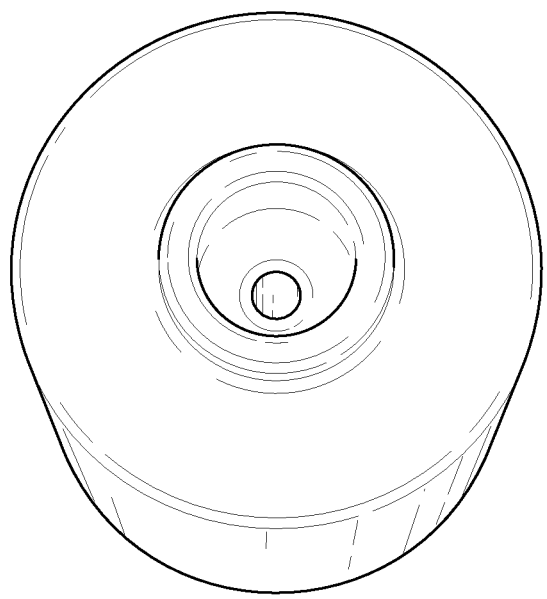
FIG. 20 is an isometric view of the top of another embodiment.
Figure 21:
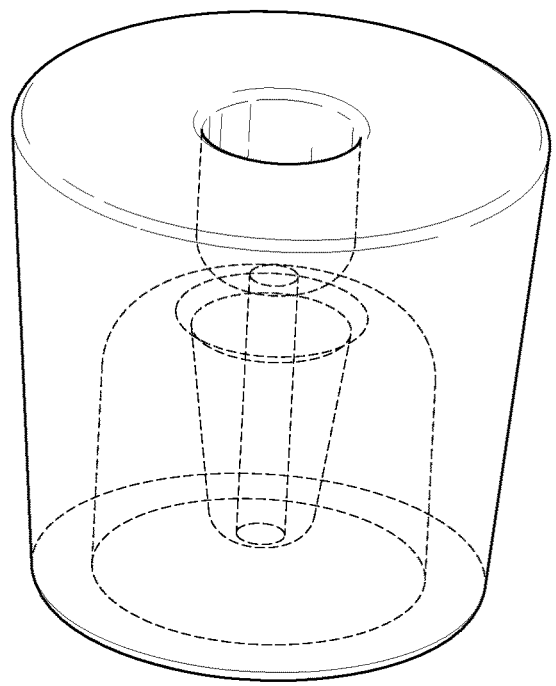
FIG. 21 is a transparent perspective of another embodiment.

Referring to FIG. 16A-16C, second illustration of the present invention is illustrated, sometimes referred to as a waterfall bong. In this illustration, a Container is not required. A vessel 1604 is utilized in this illustration. At least one hole 1602 is present on the lower portion of the Vessel 1604. If the user is utilizing a disposable plastic drinking bottle, the hole(s) 1602 can be created by puncturing the Vessel 1604. The Hole(s) 1602 may be initially capped by a users finger or by other capping means. A valve may be inserted in the Hole(s) 1602. The Vessel 1604 is filled with Water 1606 or other liquids. A pressure differential device 1610 is affixed on a Top Aperture 1608 of a Vessel 1604. An Elongated Hollow Cylinder 1614 may be optionally attached to the Inner Protruding Member (described above). Heat is applied to the combustible substance, located in the Chamber of the pressure differential device 1610, through fire, a heating element, or other heat source capable of initiating a chemical reaction of the combustible substance. Now referring to FIG. 16B, the user uncaps the Hole(s) 1602 or releases a valve, if a valve is present, and liquid exits out of the Vessel 1602, resulting in negative pressure within the Vessel 1604 interior. Consequently, air outside the Vessel 1604 is drawn through the combustible substance, the pressure differential device, and into the Vessel 1604 interior, along with Smoke or vapor 1612. If the Elongated Hollow Cylinder 1614 is present, the Smoke 1612 is filtered through the remaining Water 1606. Referring to FIG. 16C, the pressure differential device 1610 is removed from the Top Aperture 1608 and the user can inhale the Smoke or vapor 1612 from the Top Aperture 1608. The process may be repeated.

Figure 22:
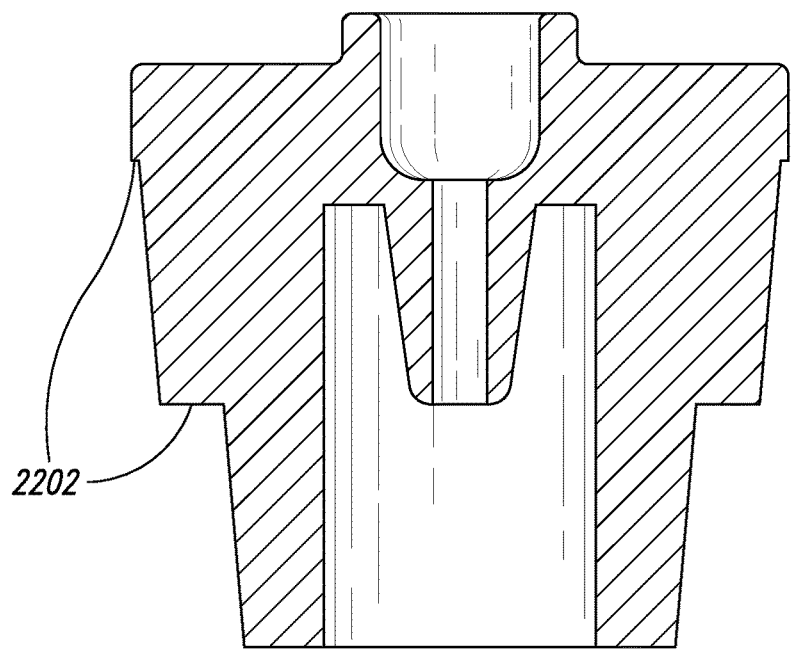
FIG. 22 is a cross section of the side of another embodiment.

Referring to FIG. 22, the same components in the same relationships are present as described with the embodiment illustrated in FIG. 5-6. The embodiment of FIG. 22 is further comprised of one or more Ridges 2202 located axially on the exterior of the body and laterally circumscribing the body. Several advantages of the Ridges 2202 are: (1) to prevent the pressure differential device from over-insertion or slipping into a vessel or accidentally being forced in by the user or the negative pressure exerted on the pressure differential device during use; (2) to increase the efficacy of the hermetic seal between the pressure differential device and the vessel Top Aperture; (3) for better seating of one or more gaskets, the gaskets being disposed at one or more Ridges 2202; (4) to better control thermal conductivity, among other uses contemplated. In alternate embodiments, one or more gaskets are disposed on one or more Ridges 2202 to improve the hermetic seal between the pressure differential device and the vessel Top Aperture as well as increase friction between the pressure differential device and the vessel Top Aperture.

In other embodiments, the combustible substance is placed within the Chamber Flange and the Tunnel is connected to the Chamber from a position elevated towards the distal end of the first end and at least 50% above the bottom of the Chamber. This allows vapor to be drawn into the Tunnel from the Combustible Substance at a portion elevated above the bottom of the Chamber. This mitigates combustible substance byproducts from falling through the Tunnel.

In alternate embodiments, a heating element is added to the chamber to vaporize the combustible substances and produce a vapor as opposed to combustion through fire. The heating element can be added to any embodiment described herein. A power source, such as a battery, may be added to power the heating element. The heating element may be configurable to activate and change heating temperature.

While illustrative embodiments have been illustrated and described, it will be appreciated that various changes can be made there without departing from the spirit and scope of the invention.

What is claimed is:

1. A pressure differential device demountably couplable to a vessel, comprising:
    (a) a body having a first end and a second end and a central axis;
    (b) a tunnel intersecting the first end and the second end, the tunnel vertically disposed along the central axis between the first and the second end and providing for air communication;
    (c) a chamber flange extending from the first end in a direction of the central axis, the chamber flange defining a chamber therein, the chamber coupled to the tunnel, wherein the chamber is wider than the tunnel, in air communications with the tunnel, and configured to hold a combustible substance;
    (d) a first radial flange extending from a perimeter of the second end in an opposite direction from the chamber flange, the first radial flange having a first outer wall tapered radially inward along the length of the radial flange and a first inner wall aligned with the central axis, the first radial flange configured to couple with a first vessel opening;
    (e) a second radial flange extending from the second end in the direction of the first radial flange and positioned radially inward from the first radial flange, the second radial flange having a second outer wall tapered radially inward along the length of the second radial flange and a second inner wall aligned with the central axis, the second radial flange configured to couple with a second vessel opening smaller in diameter than the first vessel opening; and
    (f) an inner protruding member extending from the second end in the direction of the first and second radial flanges and positioned radially inward from the second radial flange, the inner protruding member having an outer wall tapered radially inward along the length of the inner protruding member and an inner wall defining a portion of the tunnel and aligned with the central axis, the inner protruding member configured to receive a hollow elongated cylinder smaller in diameter than the second vessel opening.

2. The pressure differential device of claim 1, wherein the body is a frustum.

3. The pressure differential device of claim 1, wherein the chamber is comprised of a heating element and power source configured to create a chemical reaction of the combustible substance.

4. The pressure differential device of claim 1, further comprising a gasket is affixed onto one of the first and second radial flanges.

5. The pressure differential device of claim 1, further comprised of one or more perforations approximately located on the first end.

6. The pressure differential device of claim 5, wherein the second end is further comprised of one or more perforations wherein at least one perforation on the second end is in air communication with one or more perforations on the first end.

7. The pressure differential device of claim 1, wherein the body is approximately spherical.

8. The pressure differential device of claim 1, wherein the first radial flange further comprises one or more first ridges laterally circumscribing the body on the first outer wall.

9. The pressure differential device of claim 8, where one or more gaskets are disposed at the one or more first ridges.

10. The pressure differential device of claim 1, wherein the pressure differential device further comprises a screen disposed between the chamber and the tunnel.

11. The pressure differential device of claim 1, wherein the pressure differential device is constructed of aluminum with a titanium nitride coating.

12. A pressure differential device demountably couplable to a vessel, comprising:
    (a) a body having a first end and a second end and a central axis;
    (b) a tunnel intersecting the first end and the second end, the tunnel vertically disposed along the central axis between the first and the second end and providing for continuous air flow;
    (c) a chamber flange extending from the first end in a direction of the central axis, the chamber flange defining a chamber therein, the chamber coupled to the tunnel, wherein the chamber is wider than the tunnel and configured to hold a combustible substance;
    (d) a first radial flange extending from a perimeter of the second end in an opposite direction from the chamber flange, the first radial flange having a first outer wall tapered radially inward along the length of the radial flange and a first inner wall aligned with the central axis, the first radial flange configured to couple with a first vessel opening, wherein the first radial flange comprises one or more first ridges laterally circumscribing the first radial flange on the first outer wall;
    (e) a second radial flange extending from the second end in the direction of the first radial flange and positioned radially inward from the first radial flange, the second radial flange having a second outer wall tapered radially inward along the length of the second radial flange and a second inner wall aligned with the central axis, the second radial flange configured to couple with a second vessel opening smaller in diameter than the first vessel opening, wherein the second radial flange comprises one or more second ridges laterally circumscribing the second radial flange on the second outer wall; and
    (f) an inner protruding member extending from the second end in the direction of the first and second radial flanges and positioned radially inward from the second radial flange, the inner protruding member having an outer wall tapered radially inward along the length of the inner protruding member and an inner wall defining a portion of the tunnel and aligned with the central axis, the inner protruding member configured to receive a hollow elongated cylinder smaller in diameter than the second vessel opening.

13. The vessel of claim 12, further comprising one or more gaskets located on the first ridges of the first radial flange, the second ridges of the second radial flange, and the inner protruding member.

14. The vessel of claim 12, wherein the chamber is further comprised of a configurable heating element and a power source.

15. The pressure differential device of claim 1, wherein the second radial flange further comprises one or more second ridges laterally circumscribing the body on the second outer wall.

16. The pressure differential device of claim 15, where one or more gaskets are disposed at the one or more second ridges.

* * * * *